(12) United States Patent
Ishida et al.

(10) Patent No.: US 6,532,468 B2
(45) Date of Patent: Mar. 11, 2003

(54) BINARY DATA SEARCH METHOD FOR SELECTING FROM AMONG CANDIDATE DATA, AND APPARATUS THEREFOR

(75) Inventors: Yoshihiro Ishida, Chiba (JP); Masahiro Konishi, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/215,556

(22) Filed: Dec. 18, 1998

(65) Prior Publication Data

US 2002/0095426 A1 Jul. 18, 2002

(30) Foreign Application Priority Data

Dec. 25, 1997 (JP) .............................................. 9-357296
Feb. 12, 1998 (JP) ............................................ 10-029773

(51) Int. Cl.$^7$ .......................... G06F 17/00; G06F 12/00
(52) U.S. Cl. ...................... 707/101; 707/104.1; 711/217
(58) Field of Search ................................ 707/1–3, 100, 707/101, 7, 104.1; 711/101, 5, 200, 217, 100; 700/2, 4

(56) References Cited

U.S. PATENT DOCUMENTS

| 4,378,591 A | * | 3/1983 | Lemay ............................ 711/3 |
| 4,527,238 A | * | 7/1985 | Ryan et al. ................... 711/123 |
| 4,695,943 A | * | 9/1987 | Keeley et al. ............... 711/140 |
| 4,833,601 A | * | 5/1989 | Barlow et al. ............... 711/141 |
| 5,835,964 A | * | 11/1998 | Draves et al. ............... 711/207 |

OTHER PUBLICATIONS

Haq et al "Parallel algorithms for balancing threaded binary search trees", IEEE 1989, pp. 286–290.*

* cited by examiner

Primary Examiner—Safet Metjahic
Assistant Examiner—Uyen Le
(74) Attorney, Agent, or Firm—Oliff & Berridge, PLC

(57) ABSTRACT

In a binary search, two storage units are prepared so that when the least significant bit of the search address is "0" and "1", even and odd address banks respectively are used. The search object data is classified according to data belonging to the odd and even addresses in continuous addresses and allocated to these two storage units. Further, a search tree of the search address is constructed so that two data of object for a next search are stored in different storage units. Upon the binary search, addresses for the two storage units are set according to this search tree. Therefore, simultaneous readout of data is enabled, so that readout and comparison are carried out in parallel. Further, according to multiple division search of the invention, if 2 bits of the least significant bits of the search address are "00", "01", "10" and "11", a search object data is stored in first through fourth banks respectively. A search tree of the search address is constructed so that four data of object for a next search are stored in different banks. Upon a search, an address for each bank is set according to the search tree so as to enable readout of data at the same time, thereby reducing time required for the search.

10 Claims, 14 Drawing Sheets

| SIGN | DATA NUMBER | SEARCH ADDRESS ((n + 1) BIT) | EVEN/ODD |
|---|---|---|---|
| | 1 | 000000 ............ 0000 | EVEN |
| | 2 | 000000 ............ 0001 | ODD |
| | ........ | ........ | ........ |
| | ........ | ........ | ........ |
| A5 | $2^{(n-1)}$ | 001111 ............ 1111 | ODD |
| A2 | $2^{(n-1)} + 1$ | 010000 ............ 0000 | EVEN |
| A6 | $2^{(n-1)} + 2$ | 010000 ............ 0001 | ODD |
| | ........ | ........ | ........ |
| | ........ | ........ | ........ |
| A3 | $2^n$ | 011111 ............ 1111 | ODD |
| A1 | $2^n + 1$ | 100000 ............ 0000 | EVEN |
| A4 | $2^n + 2$ | 100000 ............ 0001 | ODD |
| | ........ | ........ | ........ |
| | ........ | ........ | ........ |
| | $2^n + 2^{(n-1)} + 1$ | 101111 ............ 1111 | ODD |
| | $2^n + 2^{(n-1)} + 2$ | 110000 ............ 0000 | EVEN |
| | $2^n + 2^{(n-1)} + 3$ | 110000 ............ 0001 | ODD |
| | ........ | ........ | ........ |
| | ........ | ........ | ........ |
| | $2^{(n+1)} - 1$ | 111111 ............ 1110 | EVEN |
| | $2^{(n+1)}$ | 111111 ............ 1111 | ODD |

FIG. 1

| SIGN | DATA NUMBER | SEARCH ADDRESS ((n + 1) BIT) | EVEN/ODD |
|---|---|---|---|
| | 1 | 000000 ········· 0000 | EVEN |
| | 2 | 000000 ········· 0001 | ODD |
| | ······· | ······· | ······· |
| | ······· | ······· | ······· |
| A5 | $2^{(n-1)}$ | 001111 ········· 1111 | ODD |
| A2 | $2^{(n-1)} + 1$ | 010000 ········· 0000 | EVEN |
| A6 | $2^{(n-1)} + 2$ | 010000 ········· 0001 | ODD |
| | ······· | ······· | ······· |
| | ······· | ······· | ······· |
| A3 | $2^n$ | 011111 ········· 1111 | ODD |
| A1 | $2^n + 1$ | 100000 ········· 0000 | EVEN |
| A4 | $2^n + 2$ | 100000 ········· 0001 | ODD |
| | ······· | ······· | ······· |
| | ······· | ······· | ······· |
| | $2^n + 2^{(n-1)} + 1$ | 101111 ········· 1111 | ODD |
| | $2^n + 2^{(n-1)} + 2$ | 110000 ········· 0000 | EVEN |
| | $2^n + 2^{(n-1)} + 3$ | 110000 ········· 0001 | ODD |
| | ······· | ······· | ······· |
| | ······· | ······· | ······· |
| | $2^{(n+1)} - 1$ | 111111 ········· 1110 | EVEN |
| | $2^{(n+1)}$ | 111111 ········· 1111 | ODD |

|  |  |  |  |  |
|---|---|---|---|---|
|  |  |  | 00000 | 00001 | * |
|  |  | 00010 |  |  |
|  |  |  | 00011 | <u>00100</u> |
|  | 00100 |  |  |  |
|  |  |  | 00101 | 00110 |
|  |  | 00111 |  |  |
|  |  |  | <u>01000</u> | <u>01010</u> |
| 01000 |  |  |  |  |
|  |  |  | 01001 | 01010 |
|  |  | 01011 |  |  |
|  |  |  | 01100 | <u>01110</u> |
|  | 01101 |  |  |  |
|  |  |  | <u>01100</u> | <u>01110</u> |
|  |  | 01110 |  |  |
|  |  |  | 01111 | <u>10000</u> |
| 10000 |  |  |  |  |
|  |  |  | 10001 | 10010 |
|  |  | 10011 |  |  |
|  |  |  | 10100 | <u>10110</u> |
|  | 10101 |  |  |  |
|  |  |  | <u>10100</u> | <u>10110</u> |
|  |  | 10110 |  |  |
|  |  |  | 10111 | 11000 |
|  | 11001 |  |  |  |
|  |  |  | <u>11000</u> | <u>11010</u> |
|  |  | 11010 |  |  |
|  |  |  | 11011 | <u>11100</u> |
|  | 11100 |  |  |  |
|  |  |  | 11101 | 11110 |
|  |  | 11111 |  |  |
|  |  |  | <u>00000</u> | <u>00010</u> |

| SIGN | DATA NUMBER | SEARCH ADDRESS ((n + 1) BIT) | BANK NUMBER |
|---|---|---|---|
| A1 | 1 | 000000 ········ 0000 | NO. 1 |
| A2 | 2 | 000000 ········ 0001 | NO. 2 |
|  | ········ | ········ | ········ |
|  | ········ | ········ | ········ |
| A3 | $2^{(n-1)} + 1$ | 010000 ········ 0000 | NO. 1 |
| A4 | $2^{(n-1)} + 2$ | 010000 ········ 0001 | NO. 2 |
| A5 | $2^{(n-1)} + 3$ | 010000 ········ 0010 | NO. 3 |
|  | ········ | ········ | ········ |
|  | ········ | ········ | ········ |
| A6 | $2^n + 1$ | 100000 ········ 0000 | NO. 1 |
| A7 | $2^n + 2$ | 100000 ········ 0001 | NO. 2 |
| A8 | $2^n + 3$ | 100000 ········ 0010 | NO. 3 |
| A9 | $2^n + 4$ | 100000 ········ 0011 | NO. 4 |
|  | ········ | ········ | ········ |
|  | ········ | ········ | ········ |
| A10 | $2^n + 2^{(n-1)} + 3$ | 110000 ········ 0010 | NO. 3 |
| A11 | $2^n + 2^{(n-1)} + 4$ | 110000 ········ 0011 | NO. 4 |
| A12 | $2^n + 2^{(n-1)} + 4 + 1$ | 110000 ········ 0100 | NO. 1 |
|  | ········ | ········ | ········ |
|  | ········ | ········ | ········ |
| A13 | $2^{(n+1)} - 1$ | 111111 ········ 1110 | NO. 3 |
| A14 | $2^{(n+1)}$ | 111111 ········ 1111 | NO. 4 |

FIG. 14

| FIRST | SECOND | THIRD (A) | THIRD (B) |
|---|---|---|---|
| [000000] | 000000 | 000000 | |
| 000001 | [000001] | 000001 | |
| 000010 | 000010 | [000010] | |
| 000011 | 000011 | [000011] | |
| | | | |
| 000100 | 000100 | [000100] | |
| 000101 | 000101 | [000101] | |
| 000110 | [000110] | 000110 | |
| 000111 | 000111 | [000111] | |
| | | | |
| 001000 | 001000 | [001000] | |
| 001001 | 001001 | [001001] | |
| 001010 | 001010 | [001010] | |
| 001011 | [001011] | 001011 | |
| | | | |
| 001100 | 001100 | [001100] | |
| 001101 | 001101 | [001101] | |
| 001110 | 001110 | [001110] | |
| 001111 | 001111 | [001111] | |
| | | | |
| 010000 | [010000] | 010000 | |
| [010001] | 010001 | 010001 | |
| 010010 | [010010] | 010010 | |
| 010011 | 010011 | [010011] | [010011] |
| | | | |
| 010100 | 010100 | [010100] | [010100] |
| 010101 | 010101 | 010101 | [010101] |
| 010110 | 010110 | 010110 | [010110] |
| 010111 | [010111] | 010111 | |
| | | | |
| 011000 | 011000 | [011000] | |
| 011001 | 011001 | [011001] | |
| 011010 | 011010 | [011010] | |
| 011011 | 011011 | [011011] | |
| | | | |
| 011100 | [011100] | 011100 | |
| 011101 | 011101 | [011101] | |
| 011110 | 011110 | [011110] | |
| 011111 | [011111] | [011111] | |
| | | | |
| 100000 | 100000 | [100000] | [100000] |
| 100001 | 100001 | 100001 | [100001] |
| [100010] | 100010 | 100010 | [100010] |
| 100011 | [100011] | 100011 | [100011] |

FIG. 15

| FIRST | SECOND | THIRD (A) | THIRD (B) |
|---|---|---|---|
| 100100 | 100100 | [100100] | |
| 100101 | 100101 | [100101] | |
| 100110 | 100110 | [100110] | |
| 100111 | 100111 | [100111] | |
| | | | |
| 101000 | [101000] | 101000 | |
| 101001 | 101001 | [101001] | |
| 101010 | 101010 | [101010] | |
| 101011 | 101011 | [101011] | |
| | | | |
| 101100 | 101100 | [101100] | |
| 101101 | [101101] | 101101 | |
| 101110 | 101110 | [101110] | |
| 101111 | 101111 | [101111] | |
| | | | |
| 110000 | 110000 | [110000] | |
| 110001 | 110001 | [110001] | |
| 110010 | [110010] | 110010 | |
| [110011] | 110011 | [110011] | |
| | | | |
| 110100 | [110100] | [110100] | |
| 110101 | 110101 | [110101] | [110101] |
| 110110 | 110110 | [110110] | [110110] |
| 110111 | 110111 | 110111 | [110111] |
| | | | |
| 111000 | 111000 | 111000 | [111000] |
| 111001 | [111001] | 111001 | |
| 111010 | 111010 | [111010] | |
| 111011 | 111011 | [111011] | |
| | | | |
| 111100 | 111100 | [111100] | |
| 111101 | 111101 | [111101] | |
| 111110 | [111110] | 111110 | |
| 111111 | [111111] | 111111 | |

FIG. 16

| FIRST | SECOND | THIRD |
|-------|--------|-------|
| [000000] | [000000] | [000000] |
| 000001 | 000001 | [000001] |
| 000010 | 000010 | [000010] |
| 000011 | 000011 | [000011] |
| 000100 | [000100] | [000100] |
| 000101 | 000101 | [000101] |
| 000110 | 000110 | [000110] |
| 000111 | 000111 | [000111] |
| 001000 | [001000] | [001000] |
| 001001 | 001001 | [001001] |
| 001010 | 001010 | [001010] |
| 001011 | 001011 | [001011] |
| 001100 | 001100 | [001100] |
| 001101 | 001101 | [001101] |
| 001110 | 001110 | [001110] |
| 001111 | 001111 | [001111] |
| [010000] | [010000] | [010000] |
| 010001 | 010001 | [010001] |
| 010010 | 010010 | [010010] |
| 010011 | 010011 | [010011] |
| 010100 | [010100] | [010100] |
| 010101 | 010101 | [010101] |
| 010110 | 010110 | [010110] |
| 010111 | 010111 | [010111] |
| 011000 | [011000] | [011000] |
| 011001 | 011001 | [011001] |
| 011010 | 011010 | [011010] |
| 011011 | 011011 | [011011] |
| 011100 | [011100] | [011100] |
| 011101 | 011101 | [011101] |
| 011110 | 011110 | [011110] |
| 011111 | 011111 | [011111] |
| [100000] | [100000] | [100000] |
| 100001 | 100001 | [100001] |
| 100010 | 100010 | [100010] |

FIG. 17

| FIRST | SECOND | THIRD |
|---|---|---|
| 100011 | 100011 | [100011] |
| | | |
| 100100 | [100100] | [100100] |
| 100101 | 100101 | [100101] |
| 100110 | 100110 | [100110] |
| 100111 | 100111 | [100111] |
| | | |
| 101000 | [101000] | [101000] |
| 101001 | 101001 | [101001] |
| 101010 | 101010 | [101010] |
| 101011 | 101011 | [101011] |
| | | |
| 101100 | [101100] | [101100] |
| 101101 | 101101 | [101101] |
| 101110 | 101110 | [101110] |
| 101111 | 101111 | [101111] |
| | | |
| [110000] | [110000] | [110000] |
| 110001 | 110001 | [110001] |
| 110010 | 110010 | [110010] |
| 110011 | 110011 | [110011] |
| | | |
| 110100 | [110100] | [110100] |
| 110101 | 110101 | [110101] |
| 110110 | 110110 | [110110] |
| 110111 | 110111 | [110111] |
| | | |
| 111000 | [111000] | [111000] |
| 111001 | 111001 | [111001] |
| 111010 | 111010 | [111010] |
| 111011 | 111011 | [111011] |
| | | |
| 111100 | [111100] | [111100] |
| 111101 | 111101 | [111101] |
| 111110 | 111110 | [111110] |
| 111111 | 111111 | [111111] |

BINARY DATA SEARCH METHOD FOR SELECTING FROM AMONG CANDIDATE DATA, AND APPARATUS THEREFOR

BACKGROUND OF THE INVENTION

1. Field of the Invention

This invention relates to a data search method for reading a search object data one by one from a memory unit in which the search object data are specified and stored by address continuous in ascending order or descending order and an apparatus therefor. Specifically, in this search method and apparatus, processing for reading out a search object data from the memory unit and data comparison processing are optimized so that despite use of a memory having the same reading speed as a conventional one, as compared to a case in which the conventional binary search is used, entire processing time necessary for data search can be reduced.

2. Description of the Related Art

FIG. 1 shows a case that totally $2^{n+1}$ search object data having n+1 search address are stored in a memory unit in which they are specified by address continuous in ascending order or descending order. Respective data are stored in the order of data number in the same figure and in the order of their value from small to large or from large to small. Referring to FIG. 1, processing in binary search in which these search object data are read out successively and compared with comparison data provided as a search key will be described.

In the binary search, usually a search address of the first time is "100000 . . . 0000" indicated by the sign A1 in FIG. 1 which is in the center of continuous address space. As a next search address, any one of "010000 . . . 000" or "110000 . . . 0000" is selected depending on a result of comparison between data specified by the first time search address and comparison data given as a search key.

In the binary search, the search address space is divided to two parts with an address in the center of the search address as a boundary and data specified by this boundary address, namely, the search address is compared with the comparison data. Further, one of the divided address space is selected depending on a result of the comparison and the selected address space is set to next search address space. After that, the same processing is repeated with the center address in the search address space as a boundary. In the binary search, the search address space is divided to two parts successively and an object data is searched.

The binary search has been well known as a retrieval method for a large amount of data because the retrieval time for N data is proportional to log N.

FIG. 2 shows a structure of a conventional binary search apparatus. Here, an address setting device 1A is connected to a search object data storage unit 30 through an address bus 5. A search data register 22A of a data comparison unit 20A is connected to the search object data storage unit 30 through a data bus 7. The address setting device 10A outputs a search address in succession. The search object data storage unit 30 outputs stored search object data to the search data register 22A of the data comparison unit 20A according to the search address. The data comparison unit 20A compares this search object data in the search data register 22A with comparison data for search preliminarily set in the comparison data register 24A. A search of one time comprises a processing for reading the search object data from the search object data storage unit 30 according to the search address and a processing for comparing the read search object data with the comparison data as shown in FIG. 3. These processings are carried out alternately and repeatedly. If both the data do not coincide with each other as a result of the comparison, a next search address is set according to which is larger. After that, these processings are repeated until the search object data coincides with the comparison data. Here, if it is assumed that the times for reading and comparison are the same and the time is Ct, an entire processing time can be expressed by a following expression (1).

$$T = 2 \times Ct \times \log N \tag{1}$$

FIG. 4 shows the reading processing and comparison processing separately.

In the data comparison unit 20A, the reading processing is not carried out as shown by a broken line of FIG. 4 in a period of the processing for comparing data in the search data register 22A with data in the comparison data register 24A. On the other hand, the comparison processing is not carried out as shown by a broken line of the same Figure in a period of the processing for reading from the search object data storage unit 30 to the search data register 22A according to the search address from the address setting device 10A. As described above, the search object data storage unit 30 and data comparison unit 20A are not actuated in a half period of the processing time required for the search. Further, the period in which they are not actuated occupies a large weight in the search processing time.

Further, as the other search method than the above described binary search method, multiple division search in which a search object area is divided to more than two can be considered. In this case, by carrying out comparisons on multiple data read from multiple divided regions at the same time, the time required for the search can be reduced. For example, the number of divisions is set to $M = 2^m$ and totally M data are read one by one in succession from each region. Next, if the read M data are compared at the same time, a processing for a single search requires M+1 cycle. Therefore, the processing time Ta required until the search is completed can be expressed as follows.

$$Ta = (M+1) \times Ct \times \log N / m \tag{2}$$

$$= (M+1)/m \times Ct \times \log N$$

If a ratio (R of a following expression) between the processing time T of the aforementioned binary search and processing time Ta for multiple division search is less than 1, it can be said that the processing time has been reduced.

$$R = Ta / T \tag{3}$$

$$= (M+1)/m \times Ct \times \log N / 2 \times Ct \times \log N$$

$$= (M+1)/m/2$$

Because the number of divisions is more than two in the expression (3) above, $M \geq 4$, $m \geq 2$. Therefore, R is 1.25 even if it is minimum, so that the multiple division search takes longer than the binary search. In the multiple division search described above, the number of comparison decreases as compared to the binary search and the frequency of data read increases, so that the entire processing time is extended.

SUMMARY OF THE INVENTION

Accordingly, the present invention has been achieved to solve the above problems and therefore, an object of the invention is to provide a data search method and an apparatus therefor capable of improving a processing speed and reducing an entire processing time required for data search as compared to a conventional binary search by optimizing a processing for reading search object data from a storage unit and a processing for data comparison even if a memory having the same reading speed as a conventional one is used.

Although the memory mentioned here refers to a general single port memory, it is not restricted thereto but a multi-port memory like a 2-port memory may be used. The single port memory refers to a general memory in which a pair of word line and bit line are provided for each memory cell of an incorporated memory cell matrix. The 2-port or multi-port memory refers to a specific memory in which by selecting two pairs or a plurality of the word lines at the same time, simultaneous access is enabled to different incorporated memory cells.

To achieve the above object, the present invention provides a binary search method in which search object data is stored in a storage unit according to continuous address in ascending order or descending order, the search object data is read out in succession and compared with comparison data given as a search key, the search object data being classified to data belonging to odd address and data belonging to even address in continuous addresses, allocated to two storage units and stored therein. When the search object data is read out, as corresponding two search addresses, an odd address and even address are specified at the same time and the readout thereof to the storage units are carried out at the same time. In parallel to this processing, the comparison of the previously read out data is carried out. As a result, idle time for access to the storage units and data comparison is eliminated thereby reducing the processing time required for the search.

Further from another aspect of the present invention, there is provided a binary search apparatus wherein search object data is stored in a storage unit according to continuous address in ascending order or descending order, the search object data is read out in succession and compared with comparison data given as a search key, the binary search apparatus comprising:

a data comparison unit for carrying out the comparison; an address setting unit for setting two addresses having different least significant bits (LSB) upon reading the search object data in succession, the search object data is classified to the data belonging to the odd address and the data belonging to the even address in the continuous addresses; a first storage unit for storing the data belong to the odd address; and a second storage unit for storing the data belonging to the even address. When the search object data is read out, as corresponding two search addresses, an odd address and even address are specified at the same time and the readout thereof to the first storage unit and second storage unit are carried out at the same time. Then, the previously read search object data and comparison data are compared with each other by the data comparison unit. As a result, the idle time for the access to the storage units is reduced thereby the processing time required for the search being also reduced.

Further, according to still another aspect of the present invention, there is provided a multiple division search method in which search object data is stored in storage units according to continuous address in ascending order or descending order, the search object data is read out in succession and compared with comparison data given as a search key, the search object data being allocated and stored in $2^n$ different storage units, where $n \geq 2$, in succession in the order of the continuous addresses. Then, when a plurality of the search object data are read out in succession, the addresses of the search object data are specified to the plurality of the storage units in which those data are stored at the same time and the search object data are read out at the same time. As a result, the processing time required for the search is reduced by simultaneous access to the plurality of the storage units.

Further, according to a further aspect of the present invention, there is provided a multiple division search apparatus wherein search object data stored in a storage unit according to continuous addresses in ascending order or descending order is read out in succession and compared with comparison data given a search key, the multiple division search apparatus comprising:

a data comparison unit for carrying out the comparison; an address setting unit for setting an address so that the storage unit from which each data is to be read out differs upon reading out a plurality of the search object data; and different storage units of power of two more than four in which the search object data are allocated and stored in the order of the continuous addresses. When the search object data are readout, the search addresses corresponding to the plurality of the storage units are specified and then the search data are read out at the same time. As a result, the processing time required for the search is reduced by the simultaneous access to the plurality of the storage units.

Hereinafter, the present invention will be described simply with reference to FIG. 1.

As an example, it is presumed that the search object data coinciding with the comparison data given as a search key is stored in a memory area specified by a search address of "000000 . . . 0011" of FIG. 1. In this case, the comparison data is stored in the comparison data register 24A. Generally, according to the conventional binary search, the search object data is read out in succession in the order of the following search addresses and the comparison data given as a search key is compared with the read out data to see which is large or whether they coincides with each other.

First step: "100000 . . . 0000" (even address)—A1 of FIG. 1

Second step: "0100000 . . . 0000" (even address)—A2 of FIG. 1

Third step: "001000 . . . 0000" (even address)

Fourth step: "0001000 . . . 0000" (even address)

As shown above, the search addresses from the first step to the fourth step are all the even address and generally, the search address before reading out the final search object data is even address. Then, only the readout of the last search object data is carried out by the odd address. Further, the address adjacent to the search address of each step is odd address.

According to the conventional binary search, the readout of the search object data from the storage unit is not carried out until a next address is determined by a result of the comparison between the search object data output by the previous readout and comparison data. Further, the search object data read oat is single. However, from the search address of the read out search object data, it is made evident that there are two candidates intended to be read out next time (not determined) before the search object data is compared with the comparison data. That is, when the address space of object for search is divided into two address spaces by a current search address, addresses located respectively in the centers of the two address spaces become candidates. That is, it is made evident that the next search address is any one of the two candidates before the comparison of the previous search object data. Therefore, by specifying the two candidate addresses of objects for a next search and reading out the search object data in parallel to this data comparison processing, it can be expected that the processing speed is improved twice as compared to the conventional processing speed. However, because the search object data are stored in the same memory according to the conventional binary search, the simultaneous readout is disabled. If data storage can be set so that the search object are stored in different memory banks and the same bank is not accessed at the same time, such simultaneous readout is enabled.

Then, the binary search method and binary search apparatus of the present invention have been achieved by noticing that the search addresses are arranged alternately in terms of odd and even and the search address of each step is even address until the last search, as described above. That is, any one of two addresses (even) of candidates for a next read out is changed (slid) to an adjacent odd address and further the memory is divided to two banks which are odd address group and even address group. In this way, the candidates for the next search come to belong to the odd bank and even bank each. The search object data are classified to data specified by the odd address and data specified by the even address according to continuous addresses in ascending order or descending order and further allocated to the odd bank and even bank, and then stored therein. Therefore, by specifying odd address and even address of a next search object data, these two memory banks are accessed at the same time so as to enable simultaneous reading out. Further, by reading out data specified by a search address of a candidate for a next search at the same time during comparison of the previously read two search object data, the comparison processing and data readout processing can be carried out continuously (FIG. 6). Thus, an entire processing time required for the binary search can be reduced despite use of a memory having the same reading speed as the conventional one.

Next, the multiple division search method and apparatus therefor of the present invention will be described. As described above, in the multiple division search method in which data is read out in succession from each of the multiple divided storage regions and compared at the same time, the entire processing time is extended as compared to the conventional binary search. In the multiple division search method and apparatus therefor of the present invention, reads of a plurality of data upon a single comparison are carried out at the same time, so as to reduce the processing time required for the search. Further, because the data to be read at the same time are stored in different storage units, no expensive memory such as a 2-port memory or multi-port memory is needed.

In the multiple division search method and apparatus therefor of the present invention, the search object data are allocated and stored in $2^n$ different storage units, where $n \geq 2$, in the order of continuous addresses. As a result, a search object data corresponding to a search address and a search object data corresponding to an address adjacent to the search address are stored in different storage units. Therefore, according to the same concept as the address setting in the even bank and odd bank by the binary search method, a plurality of the search addresses which are candidates for next readout are changed (slid) so that the plurality of the search object data can be read out from each different storage unit at the same time.

As described above, according to the multiple division search method, as compared to the conventional binary search, the frequency of comparison can be reduced and further, the number of the readout of the search object data can be reduced, so that the processing time required for the search can be also reduced.

The present invention do not restrict a concrete method for changing the search address such as the above described method. For example, the search address may be generated logically by arithmetic operation. Or it is permissible to change the search address by using any conversion table. Further, the present invention do not restrict the order of the search addresses to be generated by such a change indicated by a search tree to any particular one.

BRIEF DESCRIPTION OF THE DRAWINGS

FIG. 1 is an address table for use for explanation of binary search;

FIG. 7 is a search tree for the conventional binary search (case in which the quantity of data is 32);

FIG. 8 is a search tree of a case in which the head address is even, according to an embodiment of the binary search method and apparatus of the present invention;

FIG. 9 is a search tree of a case in which the head address is odd, according to an embodiment of the binary search method and apparatus of the present invention;

FIG. 10 is an address table for use for explanation of multiple division search;

FIG. 14 is an address table showing readout of the search object data according to an embodiment of the multiple division search apparatus of the present invention (former half portion of totally 64 data);

FIG. 15 is a continued portion of FIG. 14 (latter half portion of totally 64 data);

FIG. 16 is an address table showing readout of the search object data according to the multiple division search to which the present invention is not applied (former half portion totally 64 data); and FIG. 17 is a continued portion of FIG. 16 (latter half portion of totally 64 data)

DETAILED DESCRIPTION OF THE PREFERRED EMBODIMENTS

Hereinafter, the embodiments of the present invention will be described in detail with reference to the accompanying drawings.

Figure 2:
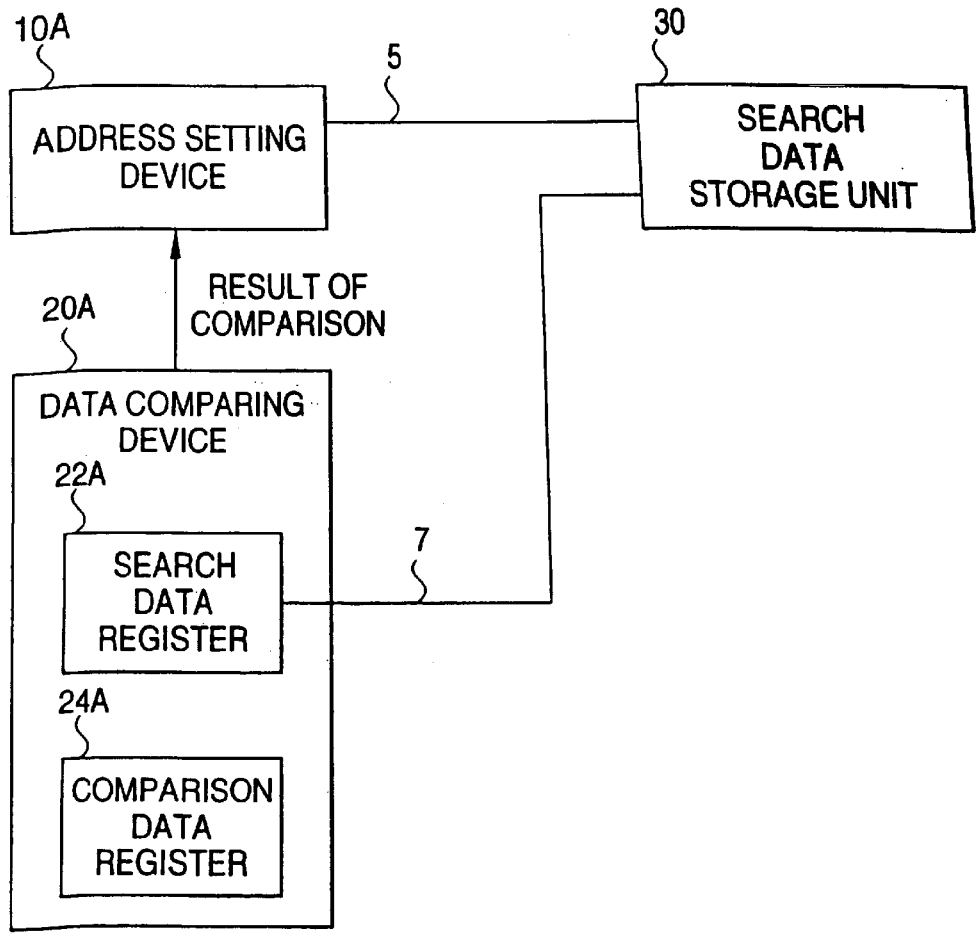
FIG. 2 is a block diagram showing a structure of a conventional binary search apparatus.
Figure 3:
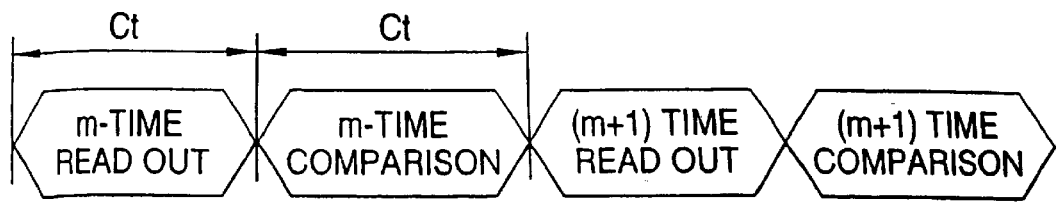
FIG. 3 is a timing chart showing search object data reading and comparison operations in the conventional binary search apparatus.
Figure 4:
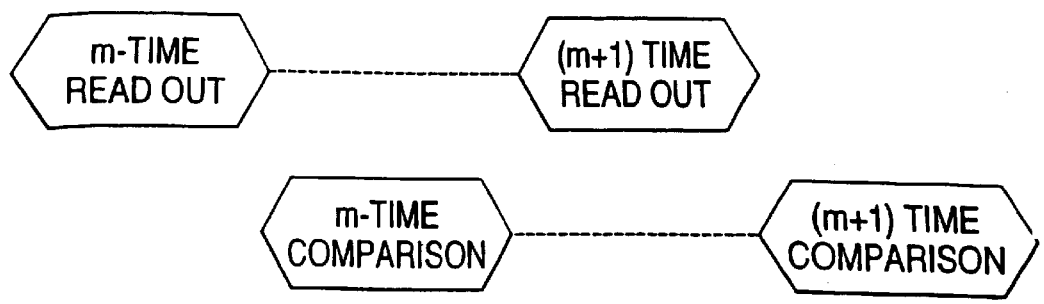
FIG. 4 is a timing chart in which the reading operation and comparison operation of FIG. 3 are shown separately.
Figure 5:
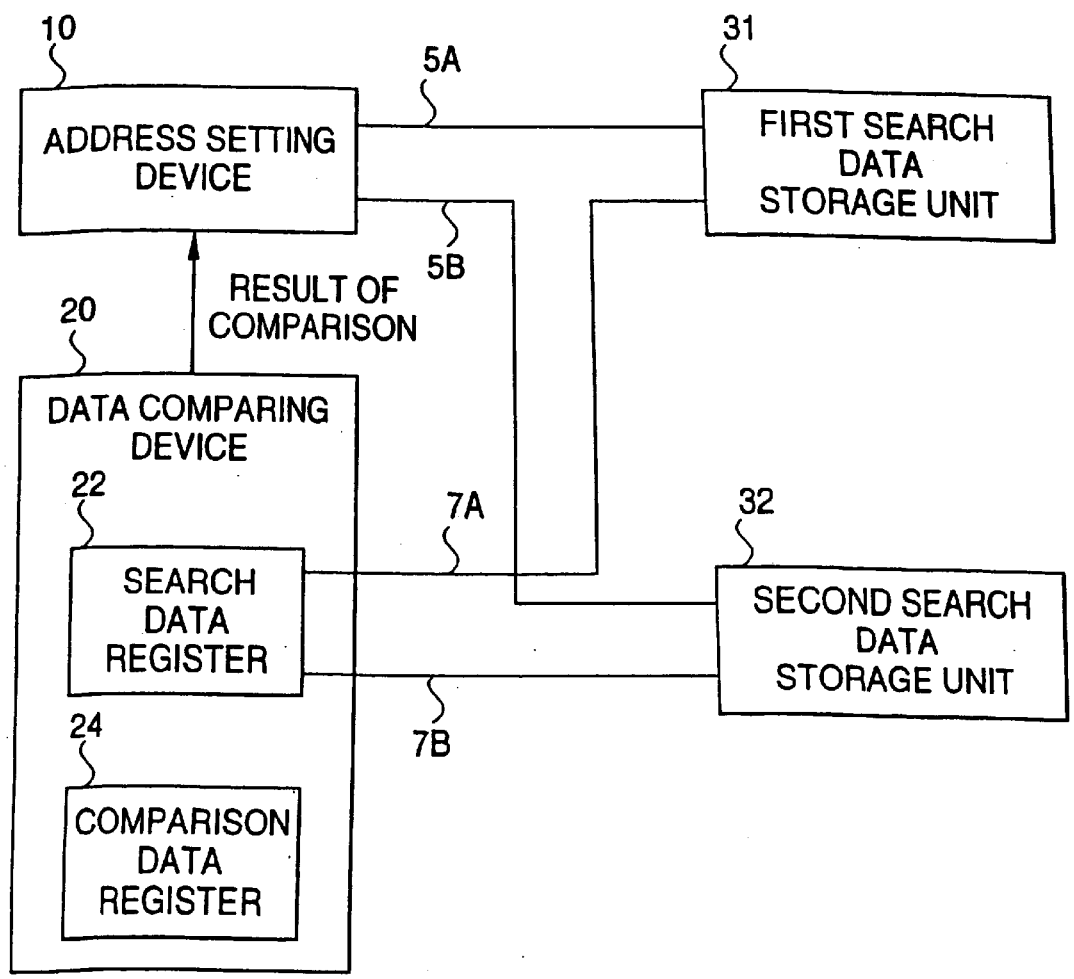
FIG. 5 is a block diagram of an embodiment of the binary search apparatus of the present invention.

FIG. 5 is a block diagram showing an embodiment of a binary search method and a binary search apparatus of the present invention. In FIG. 5, an address setting device 10 is connected to a first search object data storage unit 31 through an address bus 5A. A search data register 22 of a data comparison unit 20 is connected to the first search object data storage unit 31 through a data bus 7A. The address setting device 10 is connected to a second search object data storage unit 32 through an address bus 5B. The search data register 22 of the data comparison unit 20 is connected to the second search object data storage unit 32 through a data bus 7B. A signal line indicating a result of comparison is connected from the data comparison unit 20 to the address setting device 10.

The address setting device 10 outputs two search addresses of odd and even at the same time upon binary search. Corresponding to these two search addresses, the first search object data storage unit 31 outputs a search object data specified by the search odd address to the search data register 22 of the data comparison unit 20. At the same time, the second search object data storage unit 32 outputs a search object data specified by the search even address to the search data register 22 of the data comparison unit 20.

Here, the first search object data storage unit 31 is called odd bank and the second search object data storage unit 32 is called even bank.

The data comparison unit 20 selects data read by the search data register 22 and compares this selected data with comparison data given as a search key preliminarily set in the comparison data register 24 to verify the data. During that comparison, read out of next search object data is carried out in parallel as shown in FIG. 6.

Figure 9:
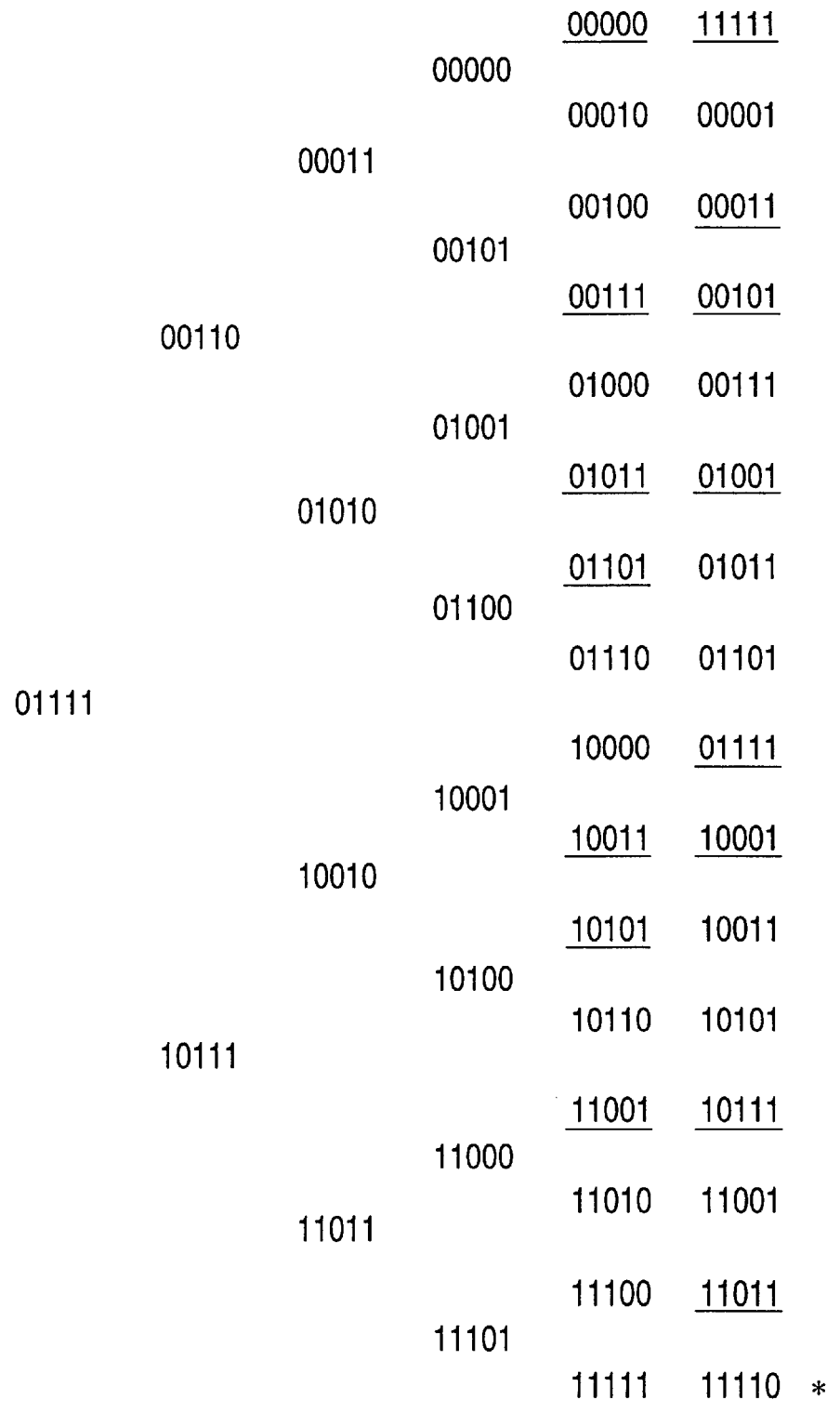

When a search object data of m time is determined, candidate for search object data of m+1 time is squeezed to two. As shown in FIGS. 8, 9, by modifying address reference tree for binary search, one of these two search object data is odd address and the other is even address. If reading of two search object data of m+1 time is carried out at the same time as data comparison of m time, data comparison of m+1 can be executed when next reading of m+2 is carried out.

Figure 6:
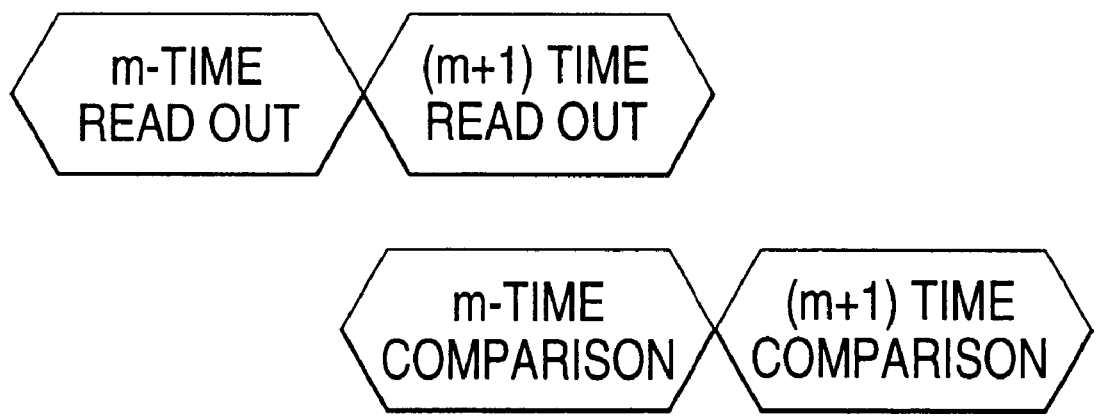
FIG. 6 is a timing chart showing the operations for reading the search object data and the comparison according to an embodiment of the present invention.

As shown in FIG. 6, reading processing and comparison processing are carried out continuously by parallel processing for reading and comparison. If time for reading processing is substantially the same as time for comparison processing, an entire processing time T for retrieval on N data can be expressed as follows.

$$T = Ct \times (\log N + 1) \quad (4)$$

As evident from this expression, the binary search can be executed in substantially half processing time as compared to the conventional art (see Expression (1)).

Next, a search tree composition method in the binary search method and binary search apparatus of the present invention will be described about case in which the search address (hereinafter referred to as head address) for specifying a search object data to be read out and compared first is even and odd. Here, it is assumed that the search address is n+1 bits and totally $2^{n+1}$ search object data are provided.

(1) Case in Which the Head Address is Even

In this case, the head address is "100000 . . . 0000".

The search address for reading the search object data for twice is "010000 . . . 0000" which is located in the even bank and "110000 . . . 0001" which is located in the odd bank. For a following explanation, each bit of the search address is expressed by variable "x", "R", "A", "B" and "C" as well as "0" and "1". Each single character of "x", "R", "A", "B" and "C" indicates any bit value of "0" or "1".

The search addresses for specifying search object data in the even bank and odd bank to be read out at the same time in m times ($3 \leq m \leq n+1$) after three times up to n+1 time are as follows.

$$\text{"xx . . . xxRA100 . . . 000"} \quad (5)$$

$$\text{"xx . . . xxRB100 . . . 001"} \quad (6)$$

In the expressions (5), (6), the bit length expressed by "xx . . . xx" on the left side of "R" is m−3 bit. This m−3 bit is the same value as the search address of the previous m−1 time.

In the next m−2 bit, "R" is a value determined by a result of comparison of m−2 time, and if the comparison data is smaller than the search object data in the result of the comparison, "R"="0" and if the comparison data is larger than the search object data, "R"="1".

"A" and "B" at m−1 bit are determined according to a result of comparison of m−1 time. In case the even bank is selected by the result of comparison, "A"="0", "B"="1". In case the odd bank is selected, "A"="1", "B"="0".

The m bit value of the search address is "1" and each bit of totally n−m bit length from m+1 bit to n bit is "0". The LSB is "0" in the even bank and "1" in the odd bank.

The search address for n+2 time readout which is carried out in parallel to n+1 time comparison is as follows in the even bank and odd bank.

$$\text{"CC . . . CCCCCCC . . . CC0"} \quad (7)$$

$$\text{"00 . . . 0000000 . . . 001"} \quad (8)$$

The length of bit string indicated by "CC . . . CCCCCCC . . . CC" in Expression (7) is n, which is bit string of the previous n+1 time search address plus "1". On the other hand, from a head of Expression (8) up to n bit are all "0". This read out of n+2 time is from the odd bank in case all bits of the search address are "0" at the previous n+1 time read and in other cases, from the even bank.

(2) Case in Which the Head Address is Odd

In this case, the head address (first search address) is "011111 . . . 1111".

The search address for read out of a second time search object data is "001111 . . . 1110" in the even bank and "101111 . . . 1111" in the odd bank.

The search address for specifying search object data in the even bank and odd bank to be read out at the same time in m times ($3 \leq m \leq n+1$) from third time to n+1 time are as follows.

$$\text{"xx . . . xxRA011 . . . 110"} \quad (9)$$

$$\text{"xx . . . xxRB011 . . . 111"} \quad (10)$$

The bit length of "xx . . . xx" on the left side of "R" is m−3 bit. This m−3 bit is of the same value as the search address of the previous m−1 time.

The R value of next m−2 is a value determined by a result of comparison of m−2 time and if the comparison data is smaller than the search object data in a result of the comparison, "R"="0" and if the comparison data is larger than the search object data, "R"="1".

The values of "A" and "B" of m−1 bit are determined by a result of the comparison of m−1 time. If the even bank is selected by the result of the comparison, "A"="1", "B"="0", and if the odd bank is selected, "A"="0", "B"="1".

The m bit value of the search address is "0" and each bit of totally n−m bit length from m+1 bit to n bit after that is "1". The LSB is "0" in the even bank and "1" in the odd bank.

The search addresses of n+2 time read out which is carried out in parallel to the n+1 time comparison are as follows in the even bank and odd bank.

$$\text{"11 ... 1111111 ... 110"} \tag{11}$$

$$\text{"CC ... CCCCCCC ... CC1"} \tag{12}$$

In the Expression (11), from the head up to n bit are all "1". On the other hand, the bit length indicated by "CC ... CCCCCCC ... CC" in the Expression (12) is n, which is a bit length of the search address of the previous n+1 time minus "1". The readout of this n+2 time is even bank if all bits of the search address at the previous n+1 time readout are "1" and in other cases, odd bank.

If in the binary search of the present invention, search addresses of the first time and second time are given as an initial value, subsequent search addresses can be obtained theoretically by arithmetic operation. A final search address needs to be adjusted in a different method from the previous method for obtaining the search address. In case the search address is operated and changed, it is necessary to take care so that there is not any leakage in the search object data to be compared.

A case in which the data quantity is up to 32 in a concrete example of the search tree composed according to the binary search of the above described present invention or a case in which the address width of the entire search space is 5 bit (n=4) will be described.

Figure 7:
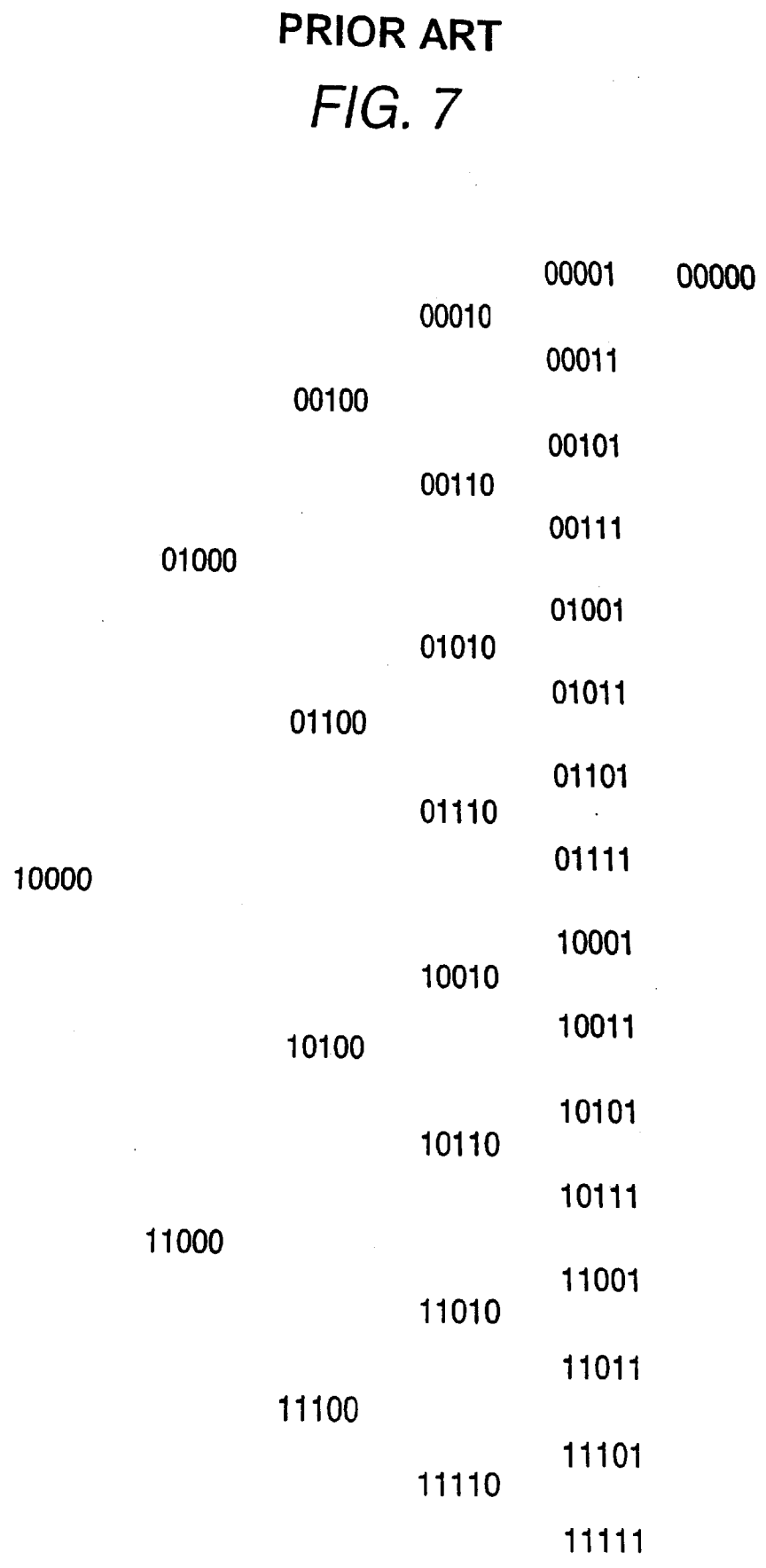

In the conventional binary search, the search tree in the order of address search order is as shown in FIG. 7. This search tree indicates addresses to be searched successively from the left to the right. A vertical direction indicates the same search order. Here, it is assumed that search object data coinciding with a comparison data given as a search key is stored in a memory region specified by search address "00011". This comparison data is stored in the comparison data register 24 and data readout and comparison are carried out in the order of such search address as "10000"→"01000"→"00100"→"00010"→"00011". Because a search of a single time requires two cycles (for read and comparison), totally 10 cycle time is required.

FIG. 8 is a search tree of the case when the head address is even in the binary search of the present invention. The search address "10000" of comparison object in the first time search processing is the same as the conventional binary search shown in FIG. 7. However, search addresses of the next comparison objects are "01000" and "11001" in FIG. 8 although they are "010000" and "11000" (both even) according to the conventional binary search. As described above, one search address "11000" of comparison object in the conventional binary search is slid by one. It is clear that about the search address of a next comparison object also, the search tree has been modified in the same method.

FIG. 9 is a search tree of a case in which the head address is odd in the binary search of the present invention. This search tree has been modified to allow to read out at the same time by operating to change one search address like a case in which the head address is even.

As described above, according to the binary search of the present invention, the memories as two banks are prepared to store the search object data. In these banks, the LSB of their addresses is classified to "0" (even bank) and "1" (odd bank) so that the search object data read out at the same time are not stored in the same banks. Further, two search addresses (one is even and the other is odd) which are next comparison objects are specified according to each search tree depending on which the head address is even or odd and the search object data are read out at the same time. Therefore, the processing speed of the binary search is improved so that the entire processing time required for the binary search can be reduced.

Meanwhile, search addresses underlined in the same Figure indicate addresses which come by duplication. Further, a search address marked with * indicates a case in which the odd bank or even bank is selected respectively in final comparison.

In the binary search of the present invention, as compared to the conventional binary search, the number of steps of the search tree is increased by one and the numbers of the search object data readout and comparison are increased by one. This reason is that the search tree is modified so as to read out data specified by the odd address and data specified by the even address at the same time when the search object data is read one by one. However, even if the search object data reading processing or comparison processing is increased by one, because at least part of such reading processing and comparison processing is carried out in parallel, the processing time for the entire search is reduced.

For example, if the reading processing time and comparison processing time of FIG. 6 are almost the same, the entire processing time is as follows, which is substantially half the conventional binary search method.

$$T=Ct\times(\log N+2) \tag{13}$$

Next, a multiple division search method and multiple division search apparatus of the present invention will be described in detail.

Figure 11:
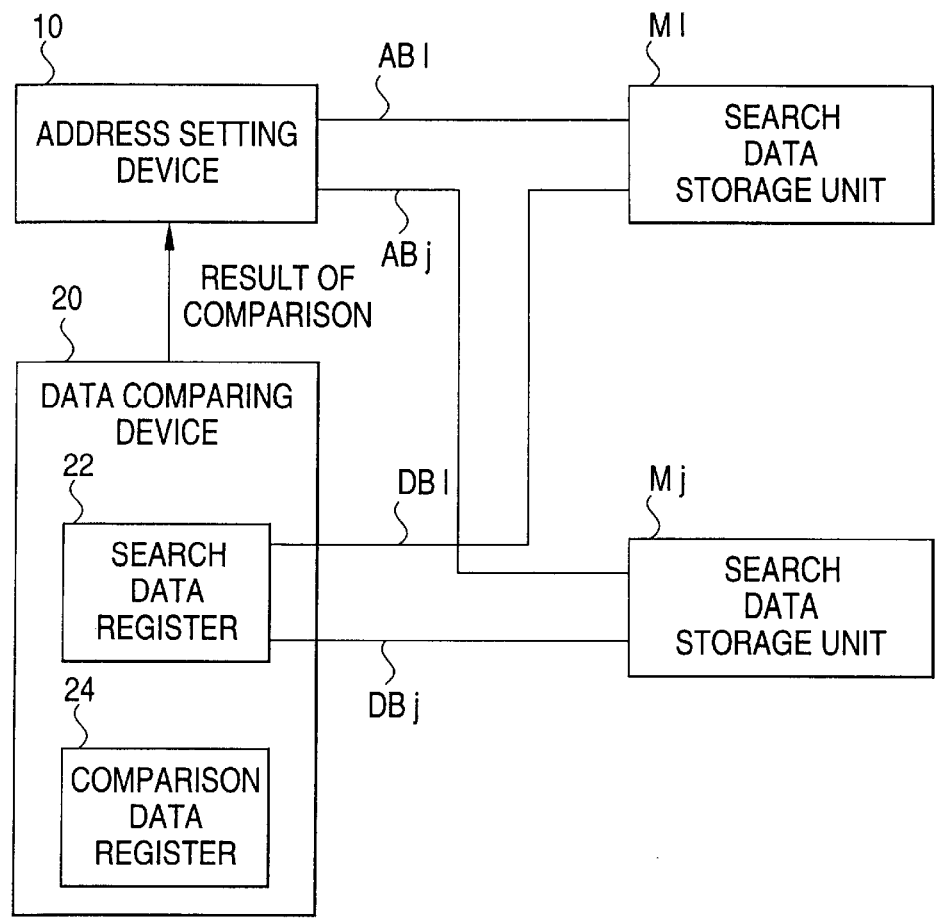
FIG. 11 is a block diagram according to an embodiment of the multiple division search apparatus of the present invention.

In FIG. 11, the search object data storage devices M1-Mj are provided in the quantity of $2^n$, where $n \geq 2$. Here, the quantity of the storage devices is j. The address setting device 10 is connected to j search object data storage devices M1-Mj through j pair of address buses AB1-Abj. The search data register 22 of the data comparison unit 20 is connected to the j search object data storage devices M1-Mj through j pairs of the data bus DB1-DBj. A signal line indicating a result of comparison is connected between the data comparison unit 20 and address setting device 10.

The address setting device 10 outputs different search addresses to the search object data storage devices M1-Mj upon the multiple division search. The search object data storage devices M1-Mj output corresponding search object data to the search data register 22 of the data comparison device 20 at the same time. The data comparison unit 20 compares a plurality of search object data in the search data register 22 with the comparison data as a search key stored in the comparison data register 24 so as to determine whether or not they coincide with each other.

In this embodiment, the search data are stored by continuous address in ascending order or descending order. These search object data are allocated to the search object data storage devices M1-Mj in the order of the continuous address and stored. That is, in the above described continuous address, if one search object data is stored in the search object data storage device M1, a next data is stored in the search object data storage device M2 and a further next data is stored in the search object data storage device M3, so that the search object data are stored in successively different search object data storage devices M1-Mj.

Here, this embodiment will be described on the premise of following condition.

B1: the search address is assumed to be n+1 bit. That is, the quantity of the search object data is assumed to be $2^{n+1}$.
B2: the quantity of the search object data storage devices M1-Mj is assumed to be 4. That is, j=4.

B3: If 2-bit value of the least significant bits of a search address is "00", the search object data is assumed to be stored in the search object data storage device M1 (hereinafter referred to as first bank). Likewise, if the 2-bit value is "01", the search object data is stored in the search object data storage device M2 (hereinafter referred to as second bank). If the 2-bit value is "10", the search object data is stored in the search object data storage device M3 (hereinafter referred to as third bank). If the 2-bit value is "11", the search object data is stored in the search object data storage device M4 (hereinafter referred to as fourth bank).

The bank numbers for storing the search object data according to the above described conditions B1–B3 are as shown in the right column of FIG. 10.

Here, it is assumed that the quantity of existing search object data to be retrieved is $2^{n+1}$. Four search object data which are read out for a single comparison and verification are desired to exist at continuous addresses disposed at the same interval. Further, these search object data are called a first search object data, a second search object data, a third search object data and a fourth search object data in the order of a smaller address.

A following example is considered under this condition. That is, very simply, the first search object data, second search object data, third search object data and fourth search object data are at continuous address disposed at the same interval or substantially same interval. That is, the quantity of the search object data is $2^{n-1}$. For example, if a first comparison/verification is considered in FIG. 10, the first search object data exists in the first bank in which the sign is A1 and the data number is "1". The second search object data also exists in the first bank in which the sign is A3 and the data number is $2^{n-1}+1$. The third search object data also exists in the first bank in which the sign is A6 and the data number is $2^{n+1}$. The fourth search object data also exists in the first bank (not shown) in which the data number is $2^n+2^{n-1}+1$.

Figure 12:
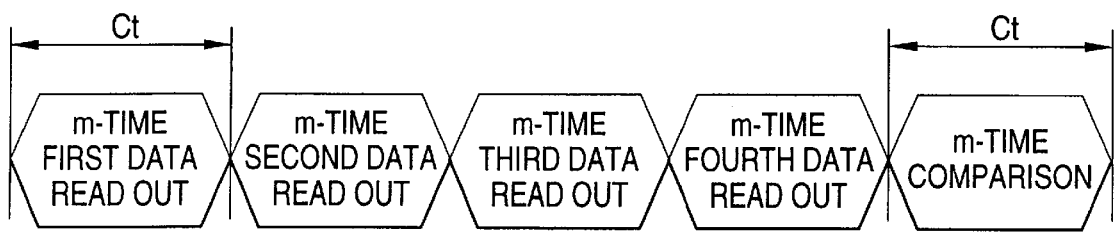
FIG. 12 is a timing chart showing operations for reading the search object data and the comparison in the multiple division search apparatus to which the present invention is not applied.

In this example, all the search object data are read out from the first bank. Thus, the first search object data, second search object data, third search object data and fourth search object data cannot be read out at the same time and therefore, processing shown in FIG. 12 is absolutely necessary.

Figure 13:
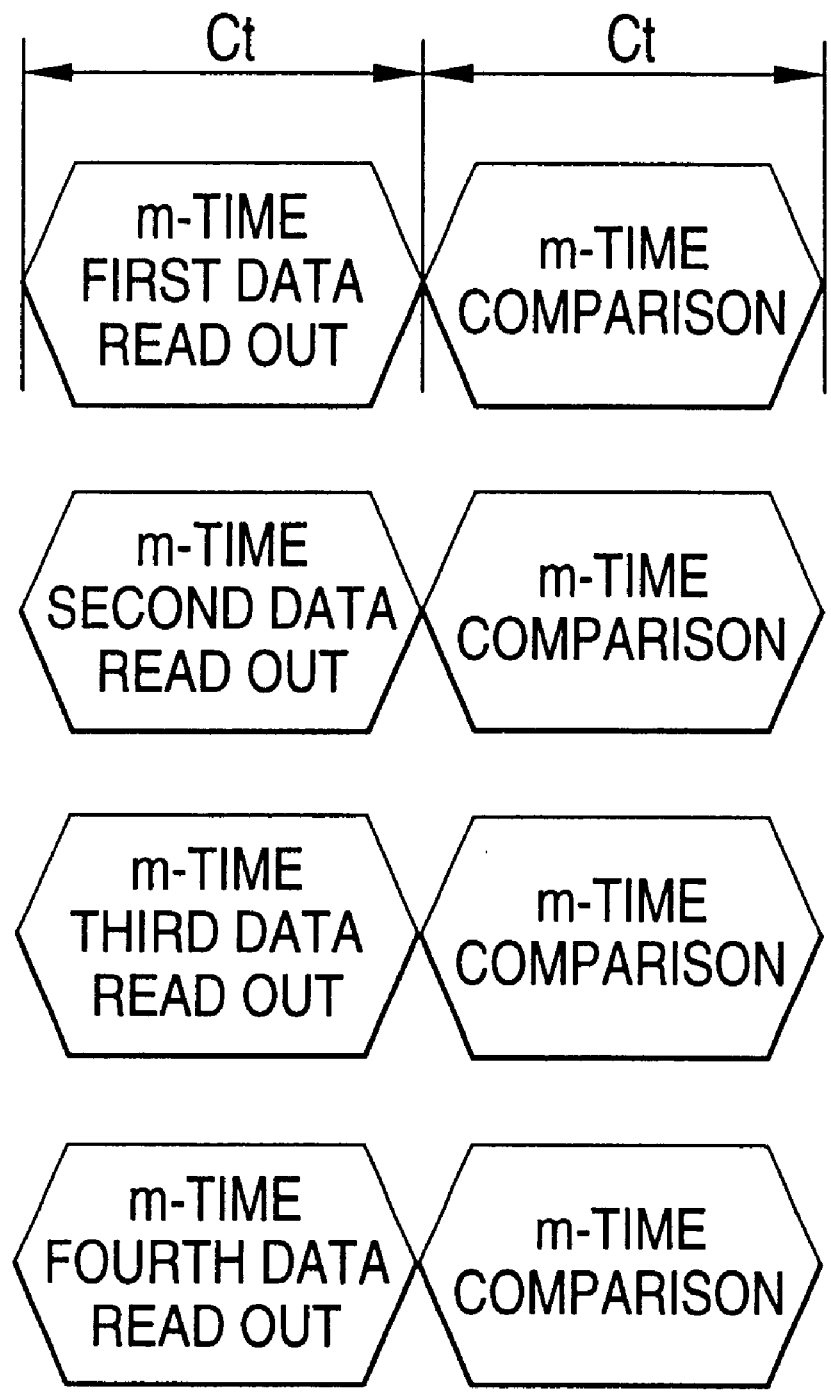
FIG. 13 is a timing chart showing the operations for reading the search object data and the comparison according to an embodiment of the multiple division search apparatus of the present invention.

On the contrary, if the present invention is applied, by changing (sliding) the address as required upon reading out the search object data, the first search object data, second search object data, third search object data and fourth search object data are stored in each different bank (storage devices). Therefore, these search object data can be read out at the same time and processed as shown in FIG. 13.

For example, in case the quantity of the search object data to be retrieved is $2^{n+1}$, $2^{n-1}$ search object data are made to exist from a head address of the first search object data to a head address of the second search object data. Likewise, $2^{n-1}$ data are made to exist from the head address of the second search object data to a head address of the third search object data, and from the head address of the third search object data to a head address of the fourth search object data, respectively. Further, $2^{n-1}-4$ data are made to exist from the head address of the fourth search object data to a head address of a final data (namely, first search object data). As a result, the first search object data, second search object data, third search object data and fourth search object data come to be stored in different banks (storage unit). If the quantity of data in these four sections and four search object data thereof are summed up, the number is $2^{n+1}$, so that it is evident that all data is covered.

Here, the first comparison/verification will be considered.

The first search object data is the first bank search object data in which the sign is A1 and data number is "1". The second search object data is the second bank search object data in which the sign is A4 and data number is "$2^{n-1}+2$". The third search object data is the third bank search object data in which the sign is A8 and data number is "$2^n+3$". The fourth search object data is the fourth bank search object data in which the sign is A11 and data number is "$2^n+2^{n-1}+4$".

There are $2^{n-1}$ search object data from sign A2 to A3, from sign A5 to A7 and from sign A9 to sign A10. Further, there are $2^{n-1}-4$ search object data from sign A12 to A14.

Hereinafter, a case in which the head address is even will be described (the same concept can be established even if the head address is odd). In this embodiment, it must be noticed that the above described conditions B1–B3 are on the premise.

First, upon the first comparison, four search object data are read out from each bank at the same time. Here, the head address of object continuous address is called reference address.

"000000 . . . 0000": first bank
"010000 . . . 0001": second bank
"100000 . . . 0010": third bank
"110000 . . . 0011": fourth bank Of these four addresses, the maximum data of data read out from a corresponding address larger than the search key is set to a next reference address. For example, if following four inequality signs are established, "010000 . . . 0001" is a reference address.

search key<search object data of "000000 . . . 0000"  (14)

search key<search object data of "010000 . . . 0001"  (15)

search key>search object data of "100000 . . . 0010"  (16)

search key>search object data of "110000 . . . 0011"  (17)

If the left side is equal to the right side in the above described expressions (14)–(17), that data is search object data, and therefore it is not necessary to advance the search further.

Here, each bit of the search address of n+1 bit is expressed by variables "x", "A"–"H", "a"–"h" and "w"–"z" as well as "0" and "1". Each character of the "x", "A"–"H", "a"–"h" and "w"–"z" indicates bit value of "0" or "1".

Next, the search address for specifying the search object data to be read out at the same time during m times $(2 \leq m \leq (n+1)/2)$ after second time up to $(n+1)/2$ are as follows.

"xx . . . xxAB000 . . . 0wab": first bank  (18)

"xx . . . xxCD000 . . . 0xcd": second bank  (19)

"xx . . . xxEF000 . . . 0yef": third bank  (20)

"xx . . . xxGH000 . . . 0zgh": fourth bank  (21)

In the respective bit strings (18)–(21), the bit length of "xx . . . xx" on the left side of "A", "C", "E", "G" is (m−1)×2 bits. This (m−1)×2 bits applies the same value as (m−1)×2 bits of the reference address at that time.

2 bits indicated by "A"–"H" are as follows.

"AB"="00"  (22)

"CD"="01"  (23)

"EF"="10"  (24)

"GH"="11"  (25)

The bit strings of 1–3 bits indicated by "a"–"h" and "w"–"z" are as follows.

"w"="0"  (26)

"ab"="lower 2 bits of the reference address"+"1"  (27)

"xcd"="ab"+"1"  (28)

"yef"="cd"+"1"  (29)

"zgh"="ef"+"1"  (30)

FIGS. 14, 15 show a case of processing on 64 search object data in which the search address is 6 bits (n=5). FIGS. 16, 17 show a case of multiple division search in which the present invention is not applied and comparison example according to the above condition (FIGS. 14, 16 indicate lower 36, 35 of continuous 64 addresses and FIGS. 15, 17 indicate upper 28, 29).

In FIGS. 14–17, the reading and comparison/verification of the search object data are carried out in the order of the first time, second time and third time as shown here. Four 6-bits surrounded by each frame of each time indicate addresses specifying search object data to be read from each bank. These four search addresses are called reference address. By comparing the search object data specified by the four reference addresses of the first time, the reference address of the second time is determined and in the same way, the reference address of the third time is determined.

In FIGS. 14, 15, there are some reference addresses of the second time which are near each other. Thus, there are overlapped reference addresses of third time which are determined by the different reference addresses of the second time. In FIGS. 14, 15, to avoid inconvenience on expression, in the same Figure, the reference address which can be obtained by the third time is represented in two types, namely A and B.

For example, as the third time reference address subsequent to the second time reference address "010000", there are "010001", "010010", "010011" and "010100" (case A of FIG. 14). As the four third time reference addresses subsequent to the second time reference address "010010", there are "010011", "010100", "010101" and "010110" (case B of FIG. 14). Corresponding to these different second time reference addresses, "010011" and "010100" overlap each other in the four reference addresses of the third time.

If attention is paid to 2 bits of the LSB side of the reference address, in case the present invention is applied (FIGS. 14, 15), the four reference addresses of each time in any of the first time to third time are "00", "01", "10", and "11", so that it is evident that four different banks are indicated. Therefore, if the present invention is applied, four search object data can be read out at the same time from different banks from the first bank to the fourth bank.

On the contrary, all 2 bits of the LSB side of the reference address are "00" in the first time and second time of a comparative example (FIGS. 16, 17) on which the present invention is not applied, thereby indicating the same bank. Therefore, such a simultaneous readout is disabled.

In conclusion, according to the binary search of the present invention, by optimizing the processing for reading the search object data from the storage unit and processing for data comparison, the processing speed of the binary search can be improved despite use of a memory having the same reading speed as the conventional type, thereby the entire processing time required for the binary search being reduced. For example, the processing time requiring 2×Ct× log N according to the conventional binary search can be reduced to Ct×(log N+2) by applying the present invention, so that the processing time can be reduced to substantially half the conventional one.

Further, according to the multiple division search of the present invention, assuming that the number of divisions of the search object area is M, the processing time required for search on N data is (2/log M)×Ct×log N. For example, the processing time of a case in which the number of division is 4 is Ct×log N, so that the search is achieved in a processing time half the conventional binary search.

What is claimed is:

1. A binary search method in which search object data is stored according to continuous address in ascending order or descending order, the search object data is read out in succession and compared with comparison data given as a search key, said method comprising the steps of:

allocating said search object data between a first storage unit that stores said search object data having an even address, and a second storage unit that stores said search object data having an odd address;

reading out a candidate data having the odd address that is located in one address space divided by a current search address from the second storage unit and reading out a candidate data having the even address that is located in another address space divided by the current search address from the first storage unit at the same time; and selecting one of the two data being read out at the same time when said search object data is read out in succession for comparison with the search key.

2. A binary search method as claimed in claim 1 wherein simultaneous reading of the data belonging to the odd address and the data belonging to the even address and the comparison are carried out in parallel.

3. A binary search method as claimed in claim 1, wherein when the search object data is read out in succession according to a search tree, said search tree is structured so that the data belonging to the odd address and the data belonging to the even address are read out at the same time.

4. A binary search apparatus wherein search object data is stored according to continuous address in ascending order or descending order, the search object data is read out in succession and compared with comparison data given as a search key, said binary search apparatus comprising:

a data comparison unit for carrying out the comparison;

an address setting unit for setting two addresses having different least significant bits (LSB) upon reading the search object data in succession, the search object data is allocated to the data belonging to the odd address and the data belonging to the even address in the continuous addresses;

a first storage unit for storing the data belonging to the odd address; and a second storage unit for storing the data belonging to the even address, a candidate data belonging to the odd address that is located in one address space divided by a current search address and a candidate data belonging to the even address that is located in another address space divided by the current search address being read out at the same time, so as to achieve the readout to the first storage unit and second storage unit, and one of the two data being read out at the same time is selected for comparison with the search key.

5. A binary search apparatus as claimed in claim 4 wherein said data comparison unit carries out the comparison in parallel to the simultaneous readout to the first storage unit and second storage unit.

6. A binary search apparatus as claimed in claim 4, wherein when the search object data is read out in succession according to a search tree, said search tree is structured so that the reading address are set at two addresses having different least significant bits (LSB) and the data belonging to the odd address and the data belonging to the even address are read out at the same time.

7. A multiple division search method in which search object data is stored according to continuous address in ascending order or descending order, the search object data is read out in succession and compared with comparison data given as a search key, said method comprising:

allocating said search object data to $2^n$ different storage units, where $n \geq 2$;

setting the addresses of the search object data so that the storage unit from which each data is to be read out differs among a plurality of the storage units; and reading out candidate data simultaneously for comparison with the search key, the simultaneous data read out and the comparison are carried out in parallel.

8. A multiple division search method as claimed in claim 7 wherein when a plurality of the search object data is read out in succession according to a search tree, said search tree is structured in such a manner that the addresses of the search object data are set so that the storage unit from which each data is to be read out differs among a plurality of the storage units and the data readouts are achieved at the same time.

9. A multiple division search apparatus wherein search object data stored according to continuous addresses in ascending order or descending order is read out in succession and compared with comparison data given as a search key, said multiple division search apparatus comprising:

$2^n$ different storage units, where $n \geq 2$, in which the search object data are allocated and stored in the order of the continuous addresses;

an address setting unit for selling the addresses of the search abject data so that the storage unit from which each data is to be read out differs upon reading out a plurality of the search object data; and a data comparison unit for carrying oat the comparison, said multiple division search apparatus carrying out read-out of candidate data from a plurality of the storage units simultaneously, wherein the simultaneous data read out and the comparison are carried out in parallel.

10. A multiple division search apparatus as claimed in claim 9 wherein when the search object data is read out in succession according to the search tree, said search tree is structured in such a manner that the addresses of the search object data are set so that the storage unit from which each data is to be read out differs and the data readouts are achieved at the same time.

\* \* \* \* \*